(12) United States Patent
Medeiros et al.

(10) Patent No.: US 7,052,741 B2
(45) Date of Patent: May 30, 2006

(54) METHOD OF FABRICATING A FIBROUS STRUCTURE FOR USE IN ELECTROCHEMICAL APPLICATIONS

(75) Inventors: Maria G. Medeiros, Bristol, RI (US); Eric G. Dow, Barrington, RI (US); Russell R. Bessette, Mattapoisett, MA (US); Craig M. Deschenes, Somerset, MA (US); Christopher N. Lafratta, Brighton, MA (US); Armand F. Lewis, Mattapoisett, MA (US); Yong K. Kim, Dartmouth, MA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 10/847,765

(22) Filed: May 18, 2004

(65) Prior Publication Data
US 2005/0266161 A1    Dec. 1, 2005

(51) Int. Cl.
*B05D 1/14*    (2006.01)
*B05D 1/38*    (2006.01)

(52) U.S. Cl. .................... 427/464; 427/462; 427/470; 427/115

(58) Field of Classification Search ........... 427/462, 427/464, 470, 115; 502/527.14, 527.24, 502/439; 118/620–640
See application file for complete search history.

(56) References Cited

U.S. PATENT DOCUMENTS 3,554,154 A * 1/1971 Thomas ................ 114/222
3,798,048 A * 3/1974 Brody et al. ............ 427/462
4,218,501 A * 8/1980 Kameya et al. ......... 428/90
4,780,437 A * 10/1988 Smith .................... 502/101
5,858,156 A * 1/1999 Abrams et al. ......... 156/230
5,873,973 A * 2/1999 Koon et al. ............ 156/272.4

FOREIGN PATENT DOCUMENTS

| CA | 452052 | * | 10/1948 |
| EP | 050 102 | * | 4/1982 |
| JP | 07-320987 A | * | 12/1995 |

OTHER PUBLICATIONS

Russell R. Bessette, et al., Development and Characterization of a Novel Carbon Fiber Based Cathode for Semi Fuel Cell Application, Journal of Power Sources, 96 (2001) pp. 240-244.

Russell R. Bessette, et al., The Application of Novel Microfiber Carbon Electrodes to Magnesium-Hydrogen Peroxide Semi Fuel Cells, Proceedings of the 40th Power Sources Conference, Jun. 10-13, 2002.

* cited by examiner

*Primary Examiner*—Fred J. Parker

(74) *Attorney, Agent, or Firm*—Jean-Paul A. Nasser; James M. Kasischke; Michael P. Stanley

(57) ABSTRACT

A method is provided for the fabrication of a fibrous structure. Fibers are deposited in a hopper connected to an electrode. A mesh covers the hopper opening and the hopper is inverted and suspended over an adhesive coated substrate. An electric field is generated between the hopper and the substrate while the hopper is simultaneously shaken. As a result, fibers fall through the mesh, aligned along the electric field lines, travel through the electric field, and are coupled on one end thereof to the adhesive.

5 Claims, 2 Drawing Sheets

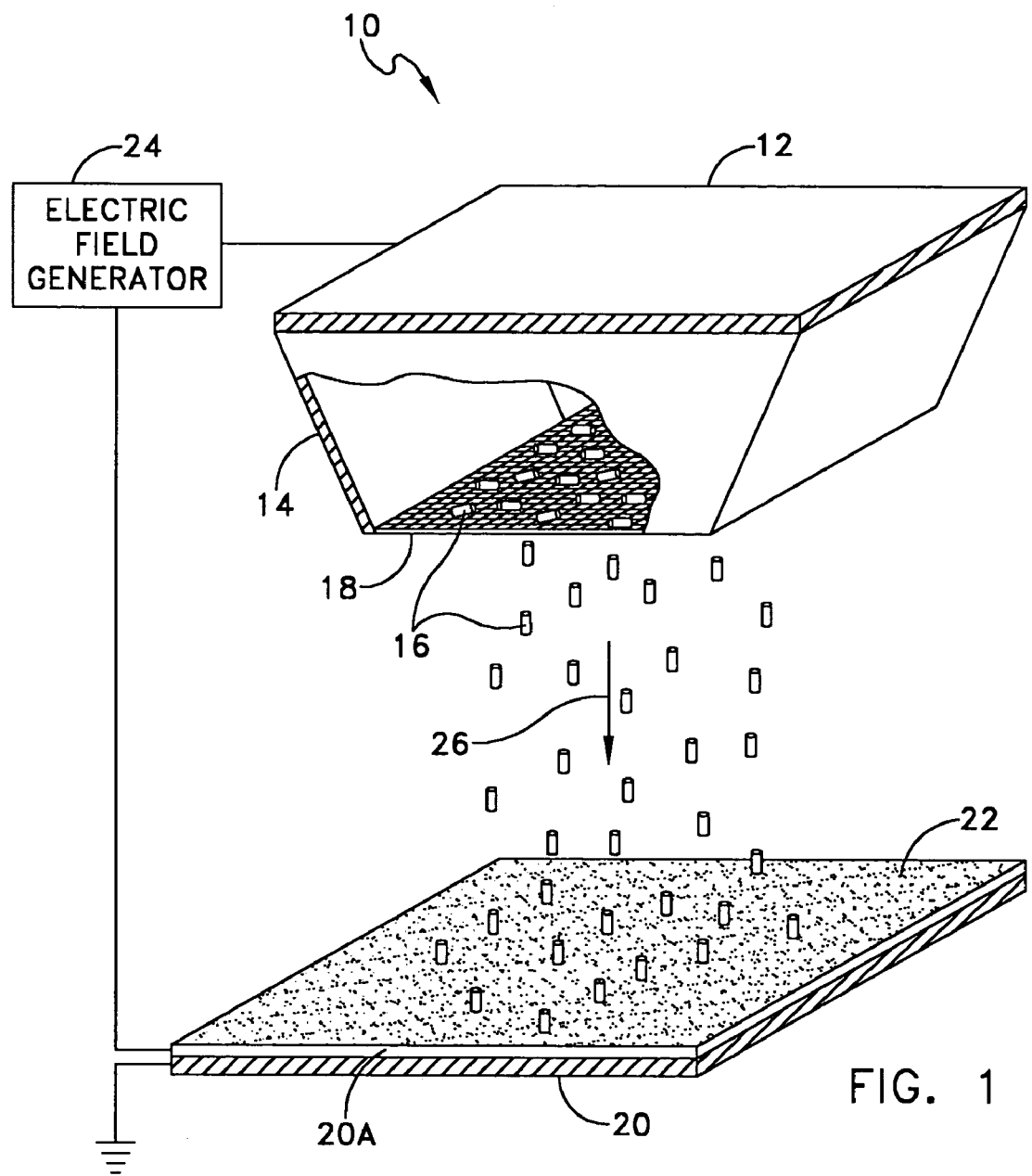
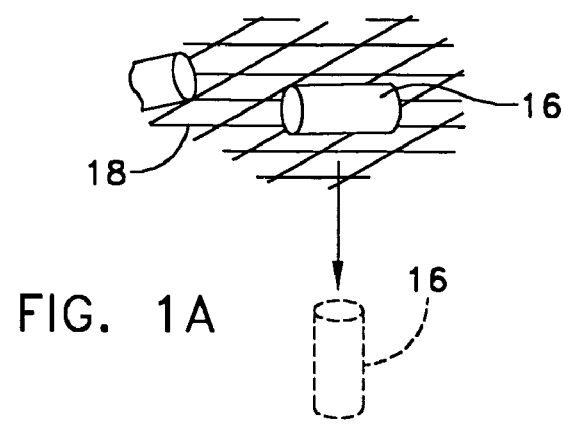
FIG. 1
FIG. 1A

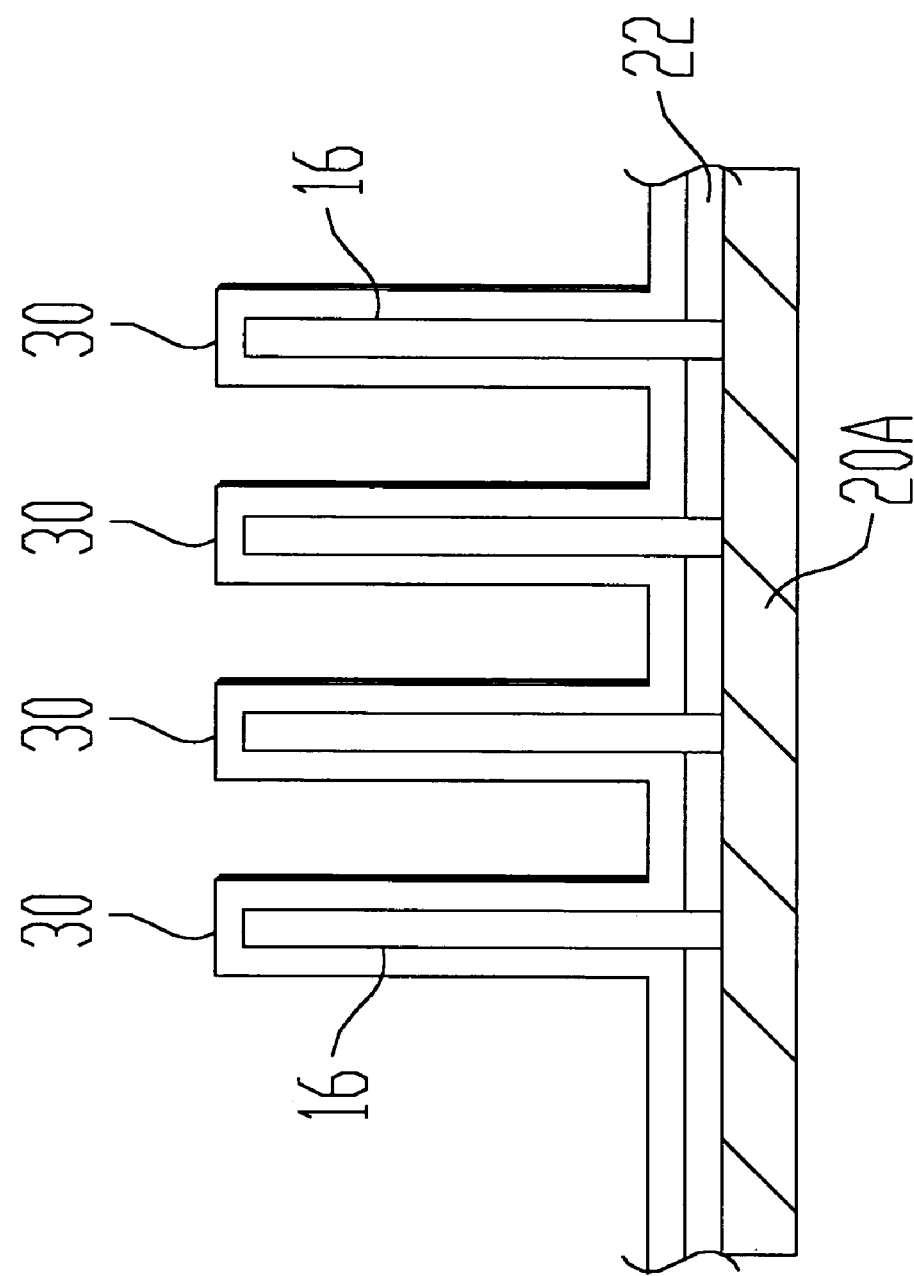

METHOD OF FABRICATING A FIBROUS STRUCTURE FOR USE IN ELECTROCHEMICAL APPLICATIONS

STATEMENT OF GOVERNMENT INTEREST

The invention described herein may be manufactured and used by or for the Government of the United States of America for Governmental purposes without the payment of any royalties thereon or therefore.

CROSS REFERENCE TO OTHER PATENT APPLICATIONS

This patent application is co-pending with a related patent application entitled DIRECT CHARGING ELECTROSTATIC FLOCKING METHOD OF FABRICATING A FIBROUS STRUCTURE FOR USE IN ELECTROCHEMICAL APPLICATIONS (Navy Case No. 84699) by Yong K. Kim, Russell R. Bessette, Michelle M. Dunnell, and Charles J. Patrissi, of whom Russell R. Bessette and Yong K. Kim are common inventors as to this application.

BACKGROUND OF THE INVENTION (1) Field of the Invention

The present invention relates generally to methods of manufacturing fibrous structures, and more particularly to a method that utilizes flocking for the fabrication of a fibrous structure that can be used in a variety of electrochemical applications such as an electrode or as a catalyst support.

(2) Description of the Prior Art

A variety of underwater operations are being tasked to unmanned underwater vehicles (UUVs). Ideally, the UUVs would utilize an onboard energy source that has a high energy density. Further, it is preferred that the energy source be reusable, efficient, cost effective, environmentally and operationally safe, have a long shelf life and not be prone to spontaneous chemical or electrochemical discharge.

Currently, a standard benchmark energy source for underwater applications is the zinc/silver oxide (Zn/AgO) electrochemical couple. However, the low energy density of this material prevents it from being the ultimate onboard energy source for the variety of underwater operations being tasked to UUVs. An energy source that has up to seven times the energy density of zinc/silver oxide batteries is needed to meet the performance demands of low-power long endurance applications for UUVs.

In order to meet the need for a higher energy density material for use as an energy source for underwater applications, researchers are developing separated flow semi-fuel cells having an anode and a replenishable cathode. For underwater applications, semi-fuel cells are being developed that exhibit efficient usage of an electroactive species such as hydrogen peroxide for the replenishable cathode. The high operational demands of these semi-fuel cells requires concentration polarization at the cathode surface to be reduced while increasing hydrogen peroxide utilization. One way of accomplishing this is to provide a cathode that has a fibrous surface (i.e., like the bristles of a brush) resulting in a higher surface area cathode.

SUMMARY OF THE INVENTION

Accordingly, it is an object of the present invention to provide a method of fabricating a fibrous structure with a high surface area.

Another object of the present invention is to provide a method of fabricating a fibrous structure for use in electrochemical applications.

Other objects and advantages of the present invention will become more obvious hereinafter in the specification and drawings.

In accordance with the present invention, a method is provided for the fabrication of a fibrous structure. In this method, a first electrode is fixed to the base of a hopper. A plurality of fibers is deposited into the hopper. Then a plastic mesh is secured over the hopper opening. The hopper is then inverted and suspended over an adhesive-coated substrate onto which the fibers are to be flocked. The substrate lies on a second electrode. Using this configuration, the fibers in the hopper lie on the plastic mesh. An electric field is then applied between the second electrode on which the substrate to be flocked lies and the electrode in the hopper. Concurrently, the hopper is shaken to facilitate the passing of the fibers through the mesh. As a result, at least a portion of the fibers leave the first electrically-conductive surface, accelerate through the electric field and are coupled on one end thereof to the adhesive. Once the substrate has been flocked and the adhesive cures, an electrochemical catalyst material is deposited on the fibers.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein:

FIG. 1 is a schematic view of the apparatus used to fabricate a fibrous structure in accordance with the present invention;

FIG. 1A is a schematic view of a fiber lying on a mesh and a fiber passing through a mesh; and FIG. 2 is a magnified side view of a portion of the fibrous structure in which each fiber serves as a support structure for another material deposited thereon.

DESCRIPTION OF THE PREFERRED EMBODIMENT(S)

Referring now to the drawings, and more particularly to FIG. 1, the apparatus used to fabricate a fibrous structure in accordance with the present invention is shown and referenced generally by numeral 10. Fabrication apparatus 10 can be used to make fibrous structures for a variety of applications to include electrodes or catalyst supports for fuel cells, semi-fuel cells, batteries, capacitors, electrochemical reactors, photovoltaic cells, or any other electrochemical cells requiring a large specific surface area such as that presented by a fibrous structure. The particular application will dictate the nature of the materials used for fabrication apparatus 10, and the ultimate fibrous structure that is made. Accordingly, it is to be understood that the present method is not limited to the particular examples that will be described herein.

In general, fabrication apparatus 10 is used as part of a method that arranges and applies material fibers onto a substrate. Initially, an electrode 12 is fixed to the base of a hopper 14. Loose fibers 16 are then selected based on the particular utilization of the fibrous structure. For example, the uniform diameter and length of the fibers 16 depend on the utilization of the fibrous structure. In a preferred embodiment, the fibers are essentially cylindrical in shape, 0.5–2.0 mm long and 5–12 µm in diameter. Longer fibers with larger diameters may prove more advantageous depending on the end use of the fibrous structure being fabricated. Similarly, the utilization of the fibrous structure determines the material and properties of fibers 16 such as whether or not they can be electrically conductive or non-conductive. For example, the fibers could be made from carbon when the fabricated structure is to be used as a catalyzed cathode in a semi-fuel cell as will be explained further below. Various forms of carbon could also be used when the fibrous structure is used for lithium insertion research. Fibers 16 could also be made from a metal oxide if the fibrous structure is to be used in a lithium-ion battery or in photovoltaic devices. Still further, fibers 16 could be made from various metals when the fibrous structure is to be used in organic electrochemistry or sensor applications.

A measured quantity of fibers 16 is selected in excess of the amount needed to create the fibrous structure in order to obtain optimum density of fibers 16. The quantity of fibers 16 is then pretreated to remove chemical impurities and possibly modify the surface of the fibers, and then heated to a sufficient temperature to remove all moisture so that the fibers 16 do not stick together in clumps. The fibers 16 are then spread loosely on the bottom of hopper 14.

Once the fibers 16 have been placed in hopper 14, a plastic mesh 18 is secured over the opening of hopper 14. The mesh 18 should be fine enough so that a fiber 16 can only fit through the mesh in a vertical and not a horizontal orientation as illustrated in FIG. 1A.

A substrate 20 (the second electrode) that supports an electrically conductive surface 20A is positioned up to 20 centimeters beneath the hopper 14. As used herein, the term "electrically conductive" refers to materials that are either highly conductive (e.g., metals) or semi-conductive (e.g., semi-conducting materials and composites). Electrically conductive surface 20A can be made from a variety of materials (e.g., metals, graphite foil, conductive metal oxides such as indium-tin oxide, high density carbon, etc.) to suit a particular application.

The shape of substrate 20 can vary depending upon the intended use of the fabricated fibrous structure. In the embodiment illustrated in FIG. 1, the surface is flat and planar, however, it could also be curved, spherical, cylindrical, or string shaped. Accordingly, it is to be understood that the choice of shape for substrate 20 and consequently conductive surface 20A is not a limitation of the present invention.

Disposed on surface 20A is a layer of adhesive 22. Depending upon the physical consistency of surface 20A and whether or not adhesive 22 is wet, adhesive 22 may need to be applied in several coats. If surface 20A is very porous or absorbent, then several coatings of adhesive 22 may need to be applied to fully permeate surface 20A so that adhesive 22 is not simply adsorbed into substrate 20. Adhesive layer 22 can be any wet or dry adhesive applied or deposited on surface 20A that will hold fibers 16 in place as will be explained further below. Wet adhesives include printing inks that are commercially available in electrically conductive formulations. Application of adhesive layer 22 can be accomplished in several different ways. For example, application can be accomplished through the use of a Meyer rod. There are a series of Meyer rods with different numbers that permit application of different thickness of adhesive. Employing a draw down bar is an alternative means of application. The method of application known in the art as screen-printing is also a successful means of application. The goal is to dispose a thin uniform film of adhesive 22 on surface 20A.

Adhesive layer 22 can be electrically conductive or non-conductive depending on the fibrous structure application and/or the ability of fibers 16 to make direct contact with electrically conductive surface 20A during the flocking process. In most cases the adhesive 22 should be chemically inert in its interaction with other materials. For example if the fibrous structure being fabricated is to be used as a catalyzed cathode in a semi-fuel cell, then the adhesive 22 should not react with the various electro-chemicals in the semi-fuel cell.

In operation, hopper 14 is inverted and suspended over substrate 20 to be flocked. Using this configuration, the fibers 16 in the hopper 14 lie on the mesh 18, not on the electrode 12. An electric field generator 24 is electrically coupled to electrode 12 and electrically conductive surface 20A. In general, electric field generator 24 applies a potential difference to surface 20A and electrode 12 such that an electric field is generated between them. As illustrated in FIG. 1, such an electric field generation can be achieved by applying a high voltage to electrode 12 and electrically coupling substrate 20 to ground potential. For safety, it is preferable that substrate 20 be made from a highly conductive (e.g., metal) material.

In operation, with fibers 16 loosely deposited on plastic mesh 18 while inverted hopper 14 is suspended or disposed over adhesive 22, electric field generator 24 is turned on. High voltage on electrode 12 generates corona discharge (ionization of the atmosphere in the hopper). Fibers 16 in hopper 14 are charged by the corona discharge.

Concurrently, hopper 14 must be shaken to allow the fibers to pass through plastic mesh 18. Shaking hopper 14 is necessary because the fibers 16 are lying horizontally on mesh 18 and can become entangled. Furthermore, the fibers 16 must be shaken to place them in the proper vertical orientation to pass through the mesh 18 in a direction perpendicular to the substrate 20 below. The frequency and magnitude of shaking must be very controlled to get a consistent fibrous structure from one fabrication to the next. The frequency of vibration will vary based on the type of fibers being used as well as the intended use of the fibrous structure.

As the corona charged fibers 16 fall through mesh 18, the resulting electric field between electrode 12 and substrate 20 causes the fibers 16 to align themselves end-to-end within the electric field as they drop towards substrate 20 in an orientation perpendicular to the substrate, in the direction indicated by arrow 26. Fibers 16 accelerate through the electric field until one end thereof embeds in adhesive layer 22. Fiber density and fiber homogeneity are dependent on shaking frequency of hopper 14, the distance between the fibers 16 and the electrode 12, the distance between the substrate 20 and fibers 16, and flocking time. The electric field can be continuously applied until some portion or all of fibers 16 are embedded in adhesive layer 22. A curing step may be required if adhesive layer 22 utilizes a wet adhesive such as a screen printing ink. Prior to curing, the previously recorded weight of substrate 20, and adhesive 22 is subtracted from the weight of substrate 20, adhesive 22 and embedded fibers 16 to determine fiber density.

As described above, the end use of the fibrous structure can dictate the materials used during the process. For applications requiring electrical conductivity throughout the fibrous structure, each of surface 20A, adhesive layer 22 and fibers 16 can comprise an electrically conductive material. In other applications, it may be desirable to use fibers 16 as a support platform for another material 30 as illustrated in FIG. 2. Material 30 could be electrically conductive or non-conductive material. For example, fibers 16 could be non-conductive supports for non-conductive material 30. Deposited material 30 could be an electrically conductive material that is coupled to electrically conductive surface 20A via electrically conductive fibers 16 and adhesive layer 22. Still further, material 30 could be a catalyst material required for a chemical reaction. For example, in terms of making an electrode for a magnesium-hydrogen peroxide semi-fuel cell suitable for underwater applications, material 30 can be an electrochemical catalyst material used to facilitate the reduction of hydrogen peroxide at the semi-fuel cell's cathode. In such an application, material 30 can be an alloy of palladium and iridium. The palladium and iridium could be deposited by either the method of controlled potential coulometry, or cyclic voltametry.

Processes for the deposition of such an alloy (as material 30) on fibers 16 is described in U.S. Pat. No. 5,296,429 and in "Electrode Surface Modification for Cathode Catalysis in Semi-Fuel Cells," J. M. Cichon et al., Proceedings of the Electrochemical Society, Vol. 98–15, p. 32–321, 1998, the contents of which are hereby incorporated by reference.

The advantages of the present invention are numerous. The fibrous structure fabrication process presented herein can be used in a wide variety of electrochemical applications. It will be understood that many additional changes in the details, materials, steps and arrangement of parts, which have been herein described and illustrated in order to explain the nature of the invention, may be made by those skilled in the art within the principle and scope of the invention as expressed in the appended claims.

What is claimed is:

1. A method of fabricating a fibrous structure, comprising the steps of:
    providing a substrate;
    applying an electrically conductive adhesive to said substrate;
    selecting a plurality of electrically conductive fibers;
    fixing a first electrode to a hopper;
    attaching a second electrode beneath said substrate;
    depositing said plurality of fibers into the hopper;
    securing a plastic mesh over an opening in the hopper;
    positioning said hopper over said substrate by inverting said hopper;
    applying an electric field between the second electrode and the first electrode;
    shaking the hopper as the electric field is applied, wherein at least a portion of said plurality of fibers fall through said mesh and are coupled on one end thereof to said adhesive in a vertical orientation; and
    allowing said adhesive to cure and then depositing an electrochemical catalyst material comprising an alloy of palladium and iridium on the plurality of fibers coupled to said adhesive using the method of controlled potential coulometry.

2. A method according to claim 1 wherein selecting a plurality of fibers further comprises the steps of:
    selecting a quantity of fibers in excess of what is needed to fabricate the fibrous structure;
    weighing said plurality of fibers;
    washing and chemically treating said fibers as necessary; and
    drying said plurality of fibers.

3. A method according to claim 1 wherein said plastic mesh has openings only large enough to allow said plurality of fibers to pass through said mesh only in a vertical orientation.

4. A method according to claim 1 wherein said applying of an adhesive to said substrate further comprises the steps of:
    applying the adhesive using screen printing techniques; and
    applying multiple layers of adhesive to ensure saturation of the substrate.

5. A method according to claim 1 wherein each of said plurality of fibers is a carbon fiber, and wherein said adhesive is chemically inert with the electro-chemicals in a semi-fuel cell.

* * * * *